United States Patent [19]

Dugdale

[11] Patent Number: 5,157,503
[45] Date of Patent: Oct. 20, 1992

[54] NEAR-INFINITY IMAGE DISPLAY SYSTEM
[75] Inventor: Jon Dugdale, Burleson, Tex.
[73] Assignee: Hughes Aircraft Company, Los Angeles, Calif.
[21] Appl. No.: 730,731
[22] Filed: Jul. 16, 1991
[51] Int. Cl.⁵ .......................... H04N 5/74; H04N 9/31
[52] U.S. Cl. .................................. 358/238; 358/250; 358/231
[58] Field of Search ................. 358/238, 237, 231, 60, 358/64, 250; 359/629, 631, 641, 838, 869

[56] References Cited
U.S. PATENT DOCUMENTS

| | | | |
|---|---|---|---|
| 298,906 | 5/1843 | Deserno | 358/250 |
| 2,165,078 | 7/1939 | Toulon | 358/250 |
| 2,285,509 | 6/1942 | Goshaw | 358/238 |
| 2,571,233 | 10/1951 | Groenenberg | 358/238 |
| 2,927,315 | 3/1960 | Calder | 358/250 |
| 3,457,365 | 7/1969 | Stokes | 358/237 |
| 4,383,740 | 5/1983 | Bordovsky | 358/238 |
| 4,623,223 | 11/1986 | Kempf | 358/238 |
| 4,859,031 | 8/1989 | Berman | 359/641 |

FOREIGN PATENT DOCUMENTS

| | | | |
|---|---|---|---|
| 746543 | 1/1944 | Fed. Rep. of Germany | 358/238 |
| 96968 | 5/1985 | Japan | 358/250 |

Primary Examiner—Tommy P. Chin
Attorney, Agent, or Firm—Michael W. Sales; Wanda K. Denson-Low

[57] ABSTRACT

A near-infinity image display system (10) has a convex-faceplate cathode ray tube (12) positioned with respect to a concave mirror (14) such that the cathode ray tube (12) is in front of the center of curvature (16) of the mirror (14) and so that the mirror (14) reflects a near-infinity image of the visual display surface to an eyepoint (20) of an observer located below and in front of the center of curvature (16) of the mirror (14) and below the cathode ray tube (12). The cathode ray tube (12) is positioned at a height above the eyepoint (20) of the observer so that it does not interrupt the vertical field of view (24) of the image reflected to the eyepoint (20) of an observer. The concave mirror (12) may be a spherical, ellipsoidal or toroidal mirror. A multiple-display system (30) may be used to create a mosaic reflected image. In the multiple-display system (30), the convex faceplates of cathode ray tubes (12) are placed side by side, and optimally spaced apart at an angle (35) to provide a near-infinity mosaic reflection to an eyepoint (20) of a single observer or eyepoints (40) and (42) of multiple observers. In the multiple-display system (30), multiple observers are spaced apart a distance (41) that optimizes independent viewing of the near-infinity image by each observer.

15 Claims, 3 Drawing Sheets

NEAR-INFINITY IMAGE DISPLAY SYSTEM

TECHNICAL FIELD OF THE INVENTION

The present invention relates to an image display system, and more particularly to an image display system for projecting a near-infinity image to an observer.

BACKGROUND OF THE INVENTION

Systems which display images are used for many purposes. Sometimes the image is simply displayed and viewed directly, such as a cathode ray tube used as a television screen or computer display. A concern in viewing images from a cathode ray tube is the viewer's exposure to radiation from the screen of the device. Since the radiation is low-level radiation, exposure can be reduced by distancing a viewer from the screen.

In another instance, it is often desirable to project to a viewer an image which is spatially realistic. For example, projecting images of landscape scenery to trainees in a flight simulator. Systems which produce an infinity or near-infinity image are used for this purpose. In such systems, the viewed image has usually been reflected and otherwise manipulated in some way. A problem with these systems is that they are complex because they use several components to produce the image to the viewer. A typical system may consist of a projector and projection screen, mirrors, beamsplitters, lenses and a final image viewing screen. The complexity of such a system is further increased by the numerous mechanisms needed to support and align the components. The complexity increases the cost of a system, and the more complex the system the more costly. In addition to the expense related to the number of components, some of the individual components are inherently costly. For example, a quality projector and screen display is relatively expensive, particularly when compared to an image-originating device such as a cathode ray tube. In general, quality optical items are expensive. Also, with respect to projection systems, the projector normally used has a shorter useful life than a CRT. The complexity of some systems also causes image abnormalities such as under illumination, lack of definition, lack of clarity, distortion and chromatic aberrations. Further, alignment of an image in a projector system which uses red, blue and green tubes is difficult. All of the problems outlined above may be exacerbated when a mosaic image is attempted. A mosaic image is a composite image of distinct displays. A display system which eliminates some of the components mentioned above would be simpler to construct, more compact, less expensive and capable of more easily providing a clear, distortion-free image.

SUMMARY OF THE INVENTION

It is an object of the invention to provide a means for viewing a cathode ray tube while reducing a viewer's exposure to radiation therefrom.

It is also an object of the invention provide a compact, inexpensive near-infinity image display system which produces a clear, distortion-free image.

It is a further object of the invention to provide a compact, inexpensive near-infinity image display system which produces a clear, distortion-free mosaic image.

According to a preferred embodiment of the present invention, a near-infinity image display system has a convex visual display surface positioned with respect to a concave mirror such that the convex visual display surface is in front of the center of curvature of the mirror and so that the mirror reflects a near-infinity image of the display surface to an eyepoint of an observer positioned below and in front of the center of curvature of the mirror and below the display surface. The convex visual display surface is preferably a faceplate of a cathode ray tube. The cathode ray tube is positioned at a height above the field of view of the image projected to the eyepoint of an observer so that it does not interfere therewith. The concave mirror may be a spherical, ellipsoidal or toroidal mirror.

In another embodiment of the invention, a multiple-display system produces a mosaic reflected image. In the multiple-display system, visual display surfaces are placed side by side, and optimally spaced apart at angles to provide a desired mosaic near-infinity image to a single observer or to multiple observers. In the multiple-display system, multiple observers are optimally spaced apart so that each observer may independently view the near-infinity image.

Other aspects, objects, features, and advantages of the present invention will become apparent to those skilled in the art upon reading the detailed description of preferred embodiments in conjunction with the accompanying drawings and appended claims.

DETAILED DESCRIPTION OF PREFERRED EMBODIMENTS OF THE INVENTION

While the specification concludes with claims particularly pointing out and distinctly claiming the subject matter which is regarded as the present invention, the invention will now be described with reference to the following description of an embodiment taken in conjunction with the accompanying drawings.

Standard display systems which project near-infinity, infinity or, in general, collimated images require at least one beamsplitter, perhaps at least one lens and, often, a backscreen and/or projector to fold the displayed image out of the line of vision of the observer and to remove aberrations and distortions from the image which are caused by routing the image out of the line of vision. In many cases, the image is ultimately projected upon and viewed from a projection screen after it has been manipulated. The present invention teaches the projection of a near-infinity image without the use of a beamsplitter, lens, backscreen or projector. The image to be viewed is not folded out of the line of vision or field of view of the observer. The invention accomplishes its objective by uniquely positioning a display surface and a concave mirror with respect to one another and relative to the position of an observer.

Figure 1:
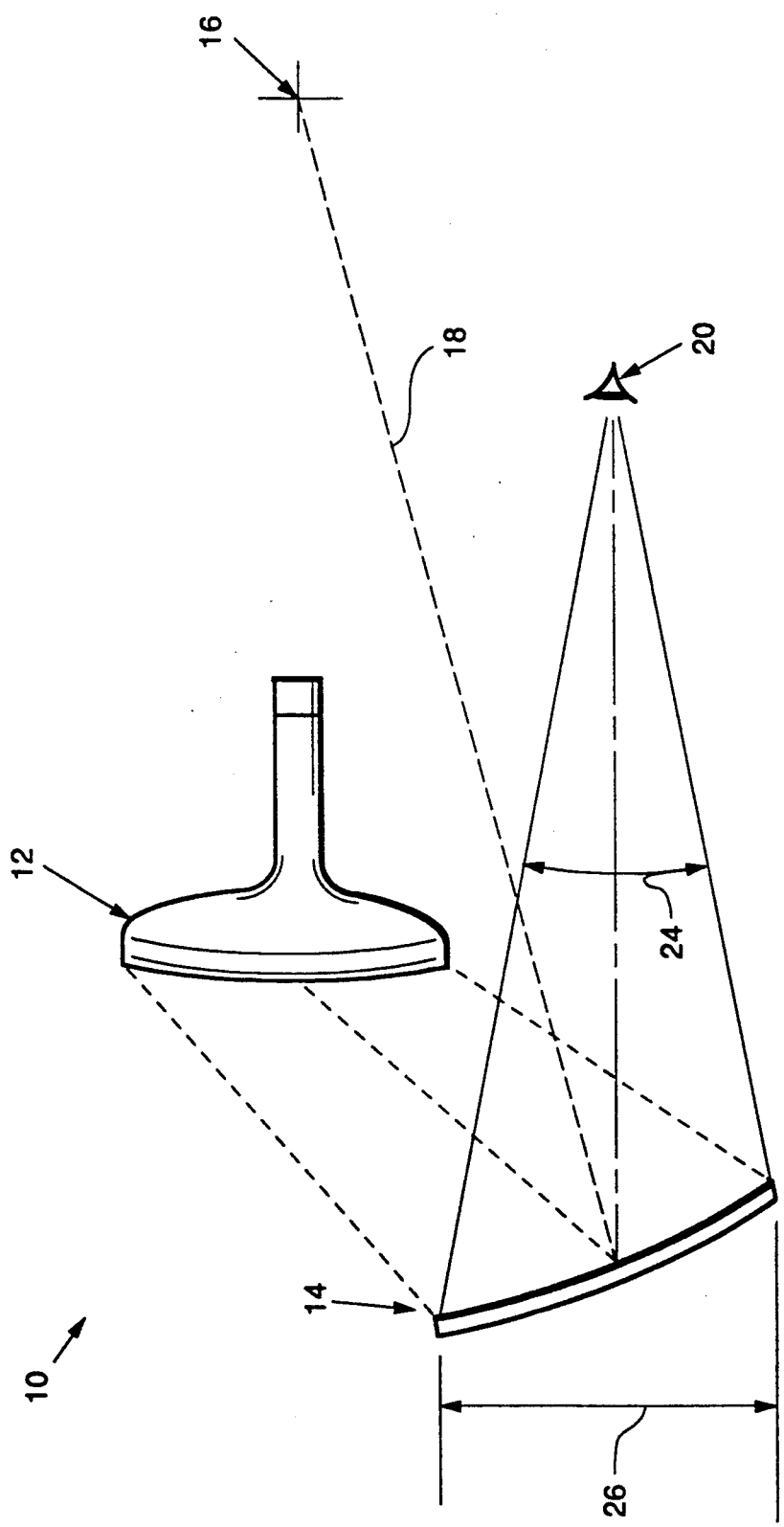
FIG. 1 is a schematic side elevational illustration of a near-infinity image display system embodying teachings of the present invention.

Referring now to FIG. 1, therein is shown a schematic representation of a near-infinity image display system 10 according to a preferred embodiment of the present invention which projects a near-infinity image of a cathode ray tube display to an eyepoint of an observer. A concave mirror 14 is the reflecting medium. The mirror 14 may be spherical, ellipsoidal or toroidal. The mirror 14 has a center of curvature 16 and a radius of curvature 18 which is the distance from a normal to the mirror 14 to the center of curvature 16. A cathode ray tube 12, commonly referred to as a "CRT," is the visual display surface which provides the image reflected by the mirror 14. More specifically, the cathode ray tube 12 has a curved faceplate which is the visual display surface that is reflected. A cathode ray tube 12 is the preferred visual display mechanism because of its relatively low cost for a quality display and its ability to easily display a variety of high quality images. A curved faceplate CRT 12 is preferred over a flat faceplate because a flat faceplate produces very noticeable and problematic aberration and makes the image difficult to focus. The quality of the reflected image is optimized by utilizing a mirror 14 and CRT 12 faceplate combination wherein the radius of curvature 18 of the mirror 14 is about two times the radius of curvature of the curved faceplate of the CRT 12. A perfect 1:2 ratio is difficult to achieve utilizing currently available CRT's but the closer the combination comes to this ratio the better the reflected image in terms of adequate illumination, clarity and chromatic trueness.

In the preferred embodiment, the display image, that is, the faceplate of the CRT 12, is positioned in front of the center of curvature 16 of the mirror 14. The eyepoint 20 of the observer is positioned below and in front of the center of curvature 16 of the mirror 14 and below the CRT 12. This is the optimum position for viewing the near-infinity image reflected. As shown, the mirror 14 may be tilted slightly upwards so that the top of the CRT 12 faceplate is captured in the reflected image. The mirror 14 is optimally tilted to produce the best reflected image while maintaining an unobstructed field of view for the observer. The vertical field of view 24 of the observer from eyepoint 20 is illustrated as an arc inscribed by an angle. The CRT 12 is positioned at a height above the eyepoint 20 of an observer so that it does not interfere with or otherwise obstruct the vertical field of view 24.

Figure 2:
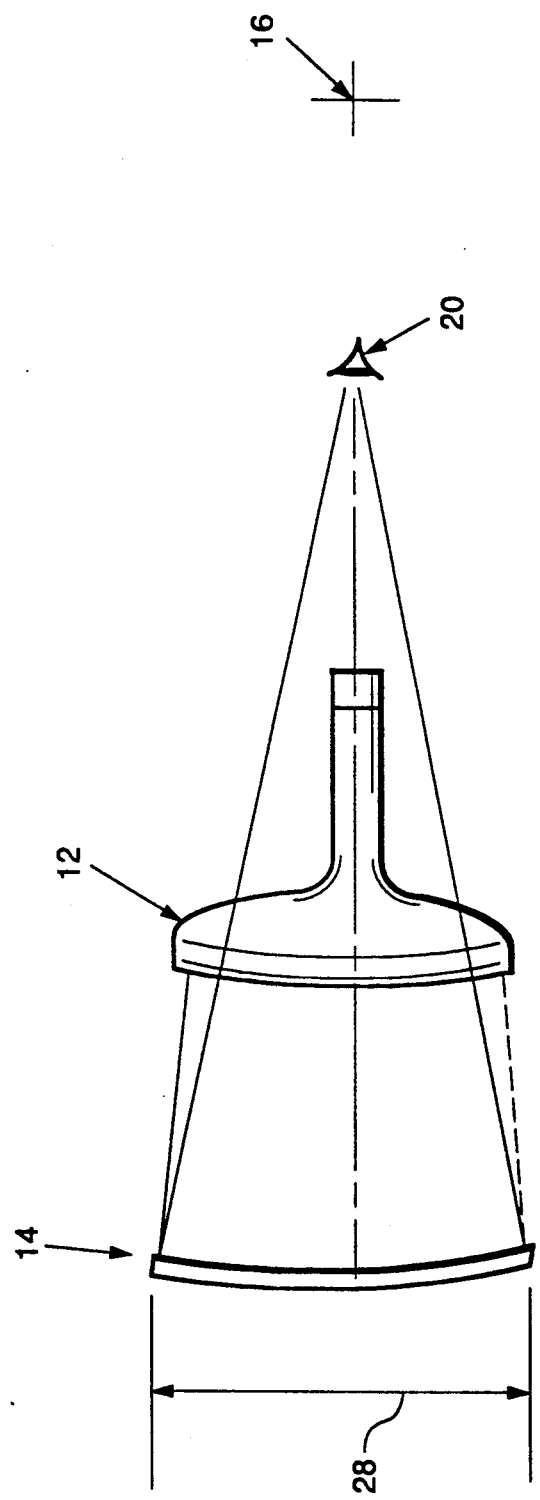
FIG. 2 is a schematic plan illustration of the invention of FIG. 1.

The system may be operated with a variety of CRT 12 curved faceplate, or curved screen, sizes. For example, diagonal screen sizes of 14, 19, 25, or 35 inches, or even larger. A desired image size and field of view may be obtained by varying the size of CRT 12 faceplates, mirror 14 size and radius of curvature 18, and position of observer eyepoint 20. Another design parameter that may impact the selection process is the amount of space which the system occupies. The space which the mirror 14 occupies in vertical and horizontal planes is important in this context. The distance 26 along a vertical axis which the mirror 14 extends is a space parameter to be considered. Referring momentarily to FIG. 2, a plan view of the schematic illustration, therein is illustrated another space parameter, namely, the distance 28 along a horizontal axis, that is, a straight horizontal line, over which the mirror 14 extends. As an example of applicable parameters, the CRT 12 may be a 19-inch curved faceplate monitor. To accommodate this CRT 12 faceplate, the mirror 14 may be a spherical, ellipsoidal or toroidal mirror having a radius of curvature 18 of 40 to 50 inches and extending a horizontal distance 28 of about 24 to 30 inches. The mirror 14 may also be sized to have a length such that the vertical distance 26 extended by the mirror would be about 16 to 20 inches upon proper tilting and alignment. Given the above parameters, the field of view angle 24 would be about 28 to 30 degrees for an observer optimally positioned in front of the center of curvature 16 of the mirror 14.

Figure 3:
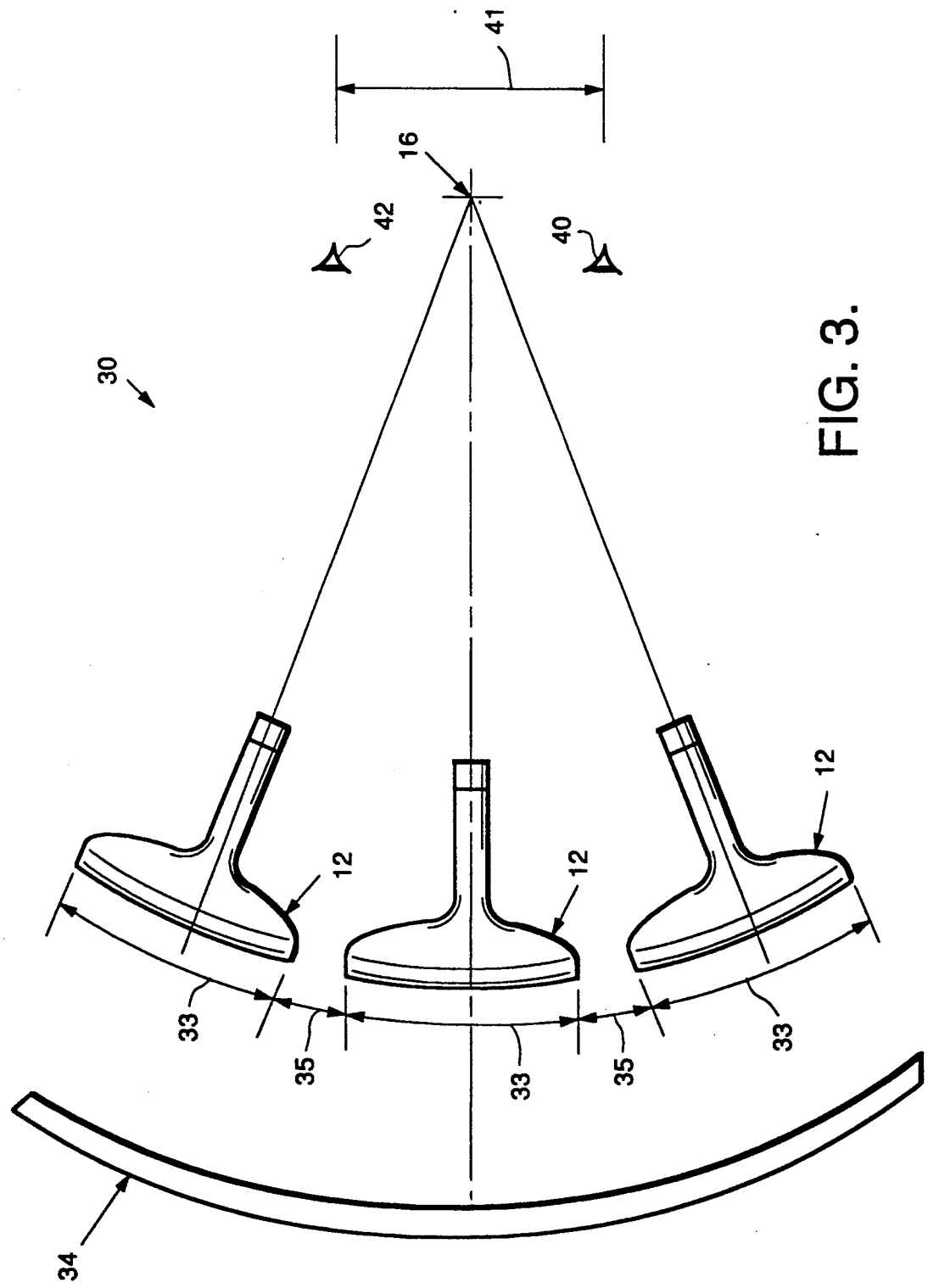
FIG. 3 is a schematic plan illustration of a multiple-display near-infinity image display system embodying additional teachings of the present invention.

Referring now to FIG. 3, a plan view of a schematic illustration of a multiple-display system 30 according to the invention, multiple CRT displays 12 are used. A side view of this arrangement would be very similar to the side view of the single display system discussed above. The multiple-display arrangement is especially useful to create a mosaic image. FIG. 3 illustrates three CRT's 12. This system is capable of accommodating two observers as illustrated by the eyepoint for a left observer 40 and the eyepoint for a right observer 42. Both of these eyepoints 40 and 42 are located in front of and below the center of curvature 16 of the mirror 14 and below the CRT's 12. The observers are separated at an optimal distance 41 with respect to one another so that each may independently receive the desired image at their respective eyepoints 40 and 42. The CRT's 12 are optimally spaced with respect to one another to achieve the desired blended mosaic. Each CRT 12 inscribes a horizontal field of view denoted by an angle 33 that contributes to the overall reflected image. Angular spacing 35 between the CRT's 12 allows the displays to be properly blended to achieve the desired imaging. The key elements remain the positioning of the CRT 12 in front of the center of curvature 16 of the mirror and the positioning of the observer or observers below and in front of the center of curvature 16 of the mirror and below the CRT 12. The elements of the system are arranged and adjusted to optimize a near-infinity image at the eyepoints 40 and 42. The vertical field of view for the multiple-display system would be the same as the vertical field of view 24 inscribed in the single-display system described above because the vertical alignment of the elements of the invention would be about the same. An example of parameters useful for the multiple-display embodiment shown would be the use of three CRT's 12 each having a 35-inch curved faceplate. The horizontal field of view 33 inscribed by each CRT 12 of this size in the configuration shown is about 34 to 36 degrees. The vertical field of view 24 would again be about 28 to 30 degrees. A suitable sized mirror 34 is a spherical, ellipsoidal or toroidal mirror having a radius of curvature of about 70 to 75 inches. Using the center of curvature 16 of the mirror 34 as a reference point, an angular spacing 35 between mirrors 34 of about 5 to 6 degrees is suitable. The mirror 34 may also be sized to have a length such that the vertical distance 26 extended by the mirror would be about 30 to 34 inches upon proper tilting and alignment. A suitable spacing 41 between observer eyepoints 40 and 42 is about 21 to 22 inches.

The invention has several advantages over other near-infinity or infinity display systems. In particular, the present invention has advantages over a system which uses a projector display. Commercially available cathode ray tubes are less expensive than projector displays. The tubes of a projector have a shorter useful life than a CRT. Alignment of an image using a CRT is much simpler than the alignment of an image using the red, blue and green tubes of a projection system. With respect to a system which employs the use of a backscreen, direct viewing of the CRT as taught by the invention eliminates the expense of a high quality backscreen and the problems inherent in achieving a uniform gain high quality diffusion coating on a backscreen. Although it is possible to project a CRT image onto a screen, direct viewing as taught by the invention yields a brighter, higher-contrast, clearer image without the problems of light transmission, backscatter, halation and hot spots common to backscreen diffusion surfaces.

The display system 10 taught by the invention may be used for video display terminals for computer systems. The near-infinity image provided by the invention helps to eliminate eye strain and, because of the distance the observer is removed from the CRT itself, the system greatly reduces radiation exposure associated with direct, close viewing of video display terminals. The system of the invention is also suitable as a visual display in simulation training devices for aircraft, spacecraft, land and water vehicles. In addition, the system is suitable as visual display for arcade style game devices and for higher end interactive generator and video disc systems. The multiple-display system is particularly suitable for simulation and entertainment uses.

As should be apparent from the foregoing specification, the invention is susceptible of being modified with various alterations and modifications which may differ from those which have been described in the preceding specification and description. Accordingly, the following claims are intended to cover all alterations and modifications which do not depart from the spirit and scope of the invention.

What is claimed is:

1. A near-infinity image display system comprising:
   a cathode ray tube having a convexly curved faceplate with a radius of curvature; and
   a concave mirror having a center of curvature and having a radius of curvature greater than said radius of curvature of said convexly curved faceplate of said cathode ray tube;
   wherein said cathode ray tube and said concave mirror are arranged with respect to one another so that said convexly curved faceplate of said cathode ray tube is in front of said center of curvature of said concave mirror and so that said concave mirror reflects a near-infinity image of said convexly curved faceplate of said cathode ray tube to an observer positioned below and in front of said center of curvature of said concave mirror and below said cathode ray tube.

2. The invention of claim 1, wherein said concave mirror is a spherical mirror.

3. The invention of claim 1, wherein said concave mirror is an ellipsoidal mirror.

4. The invention of claim 1, wherein said concave mirror is a toroidal mirror.

5. The invention of claim 1, wherein said radius of curvature of said concave mirror is about two times greater than said radius of curvature of said convexly curved faceplate of said cathode ray tube.

6. A near-infinity image display system comprising:
   at least two cathode ray tubes each having a convexly curved faceplate with a radius of curvature, positioned side by side an angular distance apart; and
   a concave mirror having a center of curvature and having a radius of curvature greater than said radius of curvature of said convexly curved faceplates of said at least two cathode ray tubes;
   wherein said at least two cathode ray tubes and said concave mirror are arranged with respect to one another so that said convexly curved faceplates of said at least two cathode ray tubes are in front of said center of curvature of said concave mirror and so that said concave mirror reflects a near-infinity mosaic image of said convexly curved faceplates of said at least two cathode ray tubes to at least one observer positioned below and in front of said center of curvature of said concave mirror and below said at least two cathode ray tubes.

7. The invention of claim 6, wherein said angular distance between said at least two cathode ray tubes is about 5 degrees.

8. The invention of claim 6, wherein said concave mirror is a spherical mirror.

9. The invention of claim 6, wherein said concave mirror is an ellipsoidal mirror.

10. The invention of claim 6, wherein said concave mirror is a toroidal mirror.

11. The invention of claim 6, wherein said radius of curvature of said concave mirror is about two times greater than said radius of curvature of said convexly curved faceplates of said at least two cathode ray tubes.

12. The invention of claim 6, wherein said at least one observer comprises at least two observers placed side by side and separated at a distance that enables each to receive said near-infinity mosaic image.

13. A method of producing a near-infinity image comprising:
    positioning at least one convexly curved visual display surface and a concave mirror having a center of curvature with respect to one another so that said at least one convexly curved visual display surface is in front of said center of curvature of said concave mirror; and
    further arranging said at least one convexly curved visual display surface and said concave mirror with respect to one another such that said concave mirror reflects a near-infinity image of said convexly curved visual display surface to at least one observer positioned below and in front of said center of curvature of said concave mirror and below said at least one convexly curved visual display surface.

14. The method of claim 13, further comprising designating a distance between an each pair of at least two observers that enables each of said at least two observers to independently view the near-infinity image of said convexly curved visual display surface.

15. The invention of claim 13, said at least one convexly curved visual display surface comprising at least one faceplate of a cathode ray tube.

* * * * *